United States Patent
Lewis

(10) Patent No.: US 9,007,236 B2
(45) Date of Patent: Apr. 14, 2015

(54) PORTABLE SYSTEM FOR EMERGENCY LANDING HELICOPTERS

(71) Applicant: Nathanial Henry Lewis, Fallon, NV (US)

(72) Inventor: Nathanial Henry Lewis, Fallon, NV (US)

( * ) Notice: Subject to any disclaimer, the term of this patent is extended or adjusted under 35 U.S.C. 154(b) by 61 days.

(21) Appl. No.: 13/987,363

(22) Filed: Jul. 18, 2013

(65) Prior Publication Data

US 2015/0022379 A1    Jan. 22, 2015

(51) Int. Cl.
*G08B 21/00* (2006.01)
*B64F 1/20* (2006.01)
*B64F 1/00* (2006.01)

(52) U.S. Cl.
CPC .. *B64F 1/20* (2013.01); *B64F 1/007* (2013.01)

(58) Field of Classification Search
CPC ......... B64F 1/20; B64F 1/007; B64C 27/006; G01C 5/005; F21V 9/006
USPC ................. 340/946, 947, 948, 953, 954, 955, 340/815.4, 815.43, 815.45, 815.66; 244/17.17, 114 R, 183; 362/183, 262, 362/227, 294, 373, 800
See application file for complete search history.

(56) References Cited

U.S. PATENT DOCUMENTS

| | | | | |
|---|---|---|---|---|
| 4,995,722 | A * | 2/1991 | Sutour | 356/139.03 |
| 5,457,442 | A * | 10/1995 | Lucero | 340/693.1 |
| 6,174,070 | B1 * | 1/2001 | Takamura et al. | 362/183 |
| 6,193,190 | B1 * | 2/2001 | Nance | 244/114 R |
| 6,592,245 | B1 * | 7/2003 | Tribelsky et al. | 362/551 |
| 8,651,713 | B2 * | 2/2014 | Espedal et al. | 362/470 |
| 2011/0174925 | A1 * | 7/2011 | Ying | 244/114 R |
| 2013/0141255 | A1 * | 6/2013 | McDermott | 340/955 |

* cited by examiner

*Primary Examiner* — Hung T Nguyen

(57) ABSTRACT

This is an electrical system not an electronic one. The light units should be placed as close to an actual circle as possible. For a helicopter visual landing in rough seas, low visibility and darkness, the approach for landing becomes a hazardous task. Good visibility of the landing area will be possible due to this system effectiveness. The helicopter can now become a truly all-weather vehicle. No new technology is needed. The parts for the system can be purchased off a store shelf, a minor modification of an existing item, or made by relatively minor fabrication.

11 Claims, 10 Drawing Sheets

PORTABLE SYSTEM FOR EMERGENCY LANDING HELICOPTERS

BACKGROUND OF THE INVENTION

1. Field of the Invention

Sometimes visibility can change within minutes, helicopters operations from small surface ships can be cut short by rough seas, low visibility and darkness, landing being by far the greatest problem. This invention is designed to greatly help solve this problem in an economical way; a system that is effective and reduces the need for at least some of the costly electronic systems. This is an electrical system not an electronic one.

2. Description of the Related Art

Radars can be too powerful to be used at short ranges. Some can have blind spots close to the ship because of sea return. Others are not designed for tracking helicopters all the way to the deck.

To guide a helicopter all the way to the deck, a high-resolution surface surveillance radar with effective filters that take away sea and rain clutter. Integrated with the radar is an electro-optical infrared camera to provide a clearer picture of the helicopter to the controllers. The above system can solve the problem. Then there is the cost factor to consider for the above and other highly technical electronic systems.

BRIEF SUMMARY OF THE INVENTION

On a small ship especially, visibility can suddenly deteriorate to a degree that, the approach for landing a helicopter becomes a hazardous task. For visual landing in rough seas, low visibility and darkness, this light system alone, or in combination with one or more less complex electronic systems for added safety can be used. Better visibility will be possible for the air crew to make a safe approach and landing. This is an electrical system not an electronic one. No high profile technical knowledge is needed to operate or repair this system, just some basic knowledge of electrical theory.

DETAILED DESCRIPTION

Figure 1:
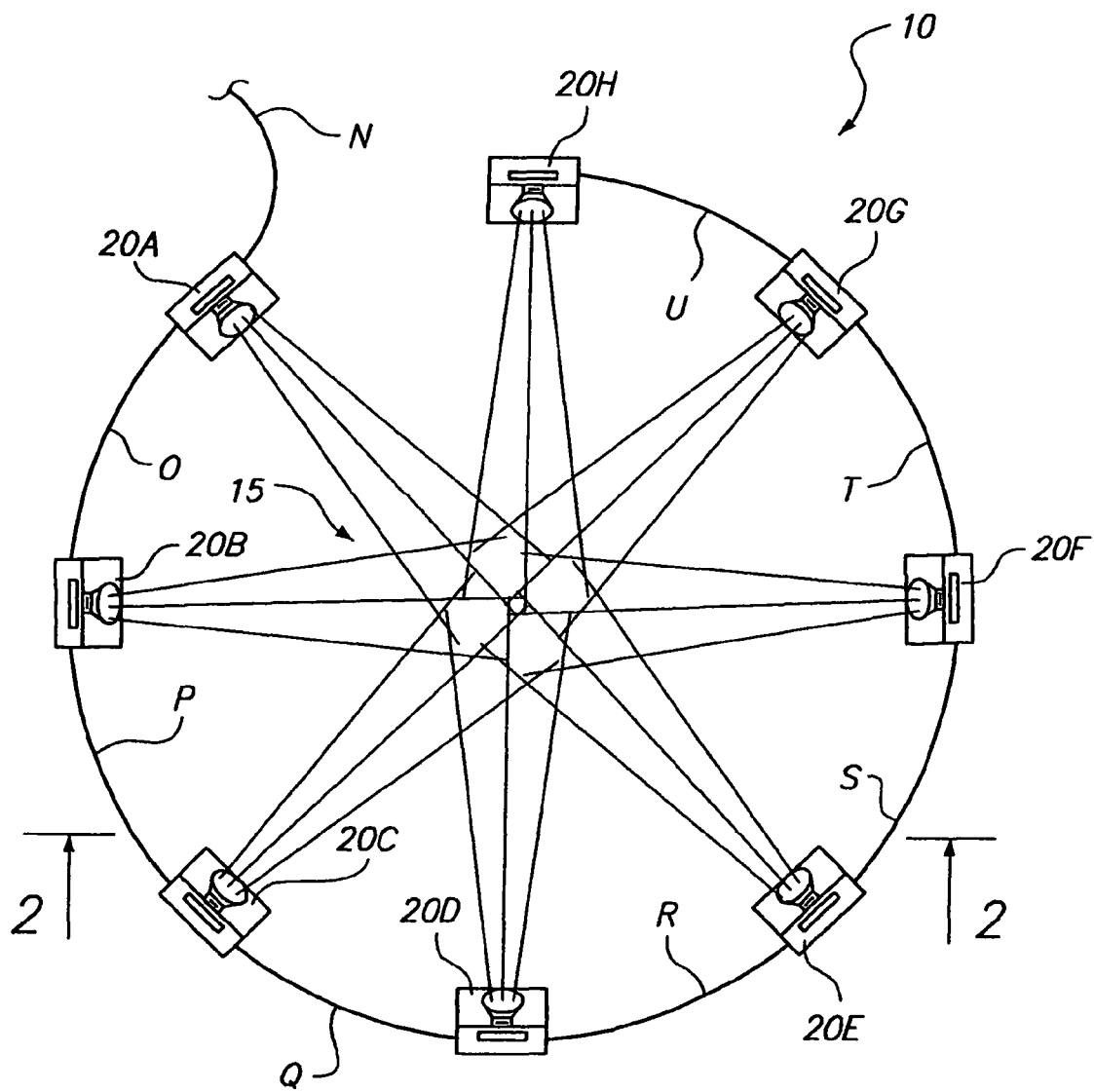
FIG. 1 is a top view of a light-circle showing the lighting effects of several light units.

FIG. 1 embodies the combination of the heating and lighting effects of several light units 20A, 20B, 20C, 20D, 20E, 20F, 20G, 20H, forming a light-circle 10 with an intense, red light-center 15. This light system will generate the necessary visibility needed by a pilot to safely land a helicopter, in rough seas, low visibility and darkness.

Figure 2:
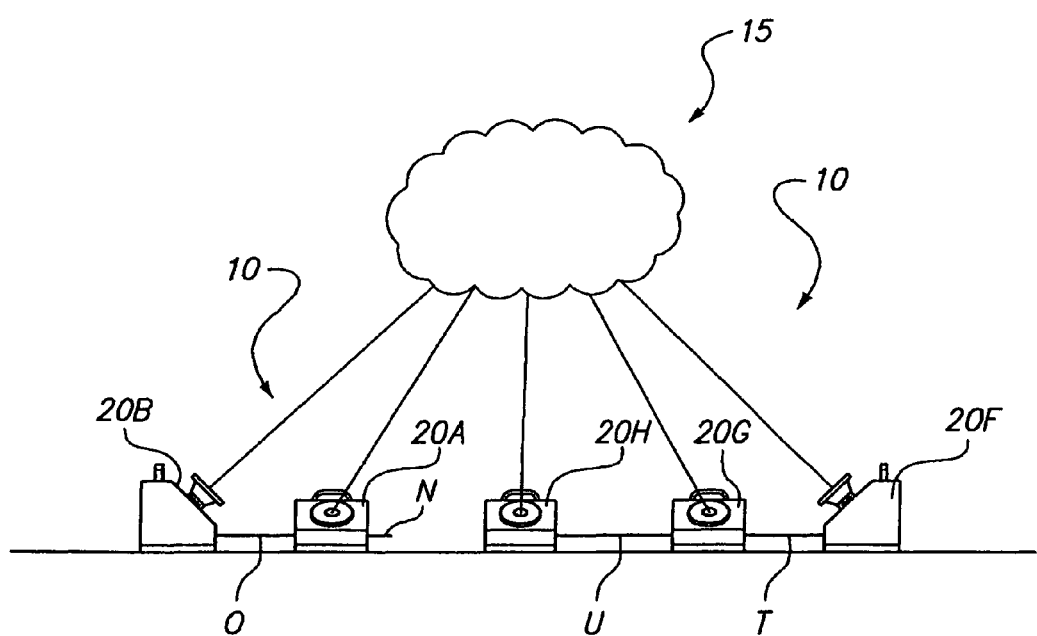
FIG. 2 is a sectional view of FIG. 1.

The light units 20A-20H should be placed as close to an actual circle as is humanly possible. This embodiment has 8 light units 20A-20H placed approximately 45 degrees apart. Other numbers of light units can be used. Light units 20A-20H are connected by means of connecting N, O, P, Q, R, S, T, U. A portable or fixed power supply is connected to the light-circle 10 by a connecting means N. See FIG. 2.

Figure 3:
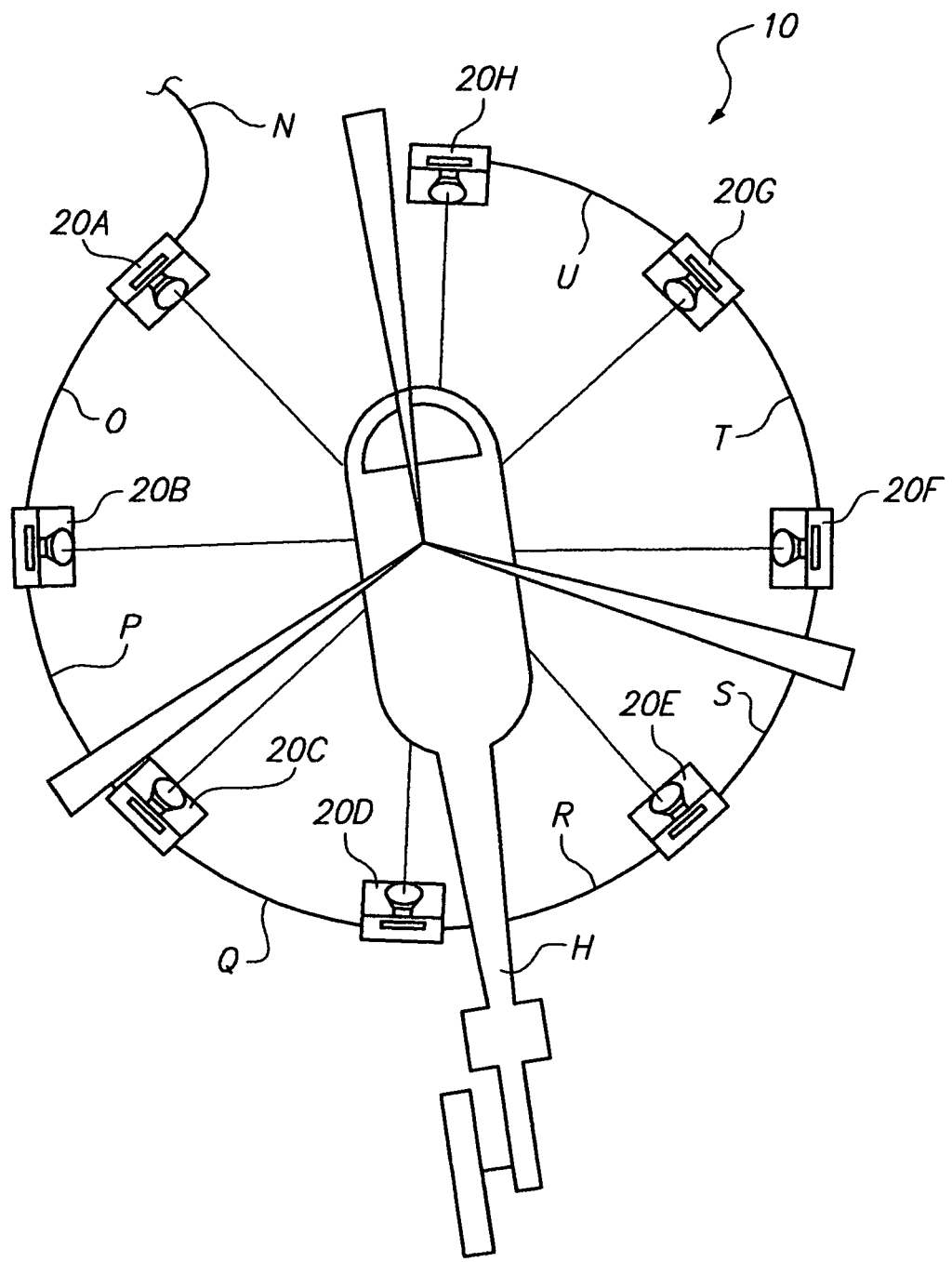
FIG. 3 is a top view of a helicopter landing into the light-circle.

FIG. 3 shows a helicopter H landing in the light-circle 10 of the light system. A pilot can get his bearing from the positions of one or more light units 20A-20H. The up and down movement of the light units 20A-20H, can tell the pilot the degree to which the ship is rocking from side to side. The pilot can slowly head for the intense, red light-center 15 and go down, see FIG. 1 and FIG. 2.

Figure 4:
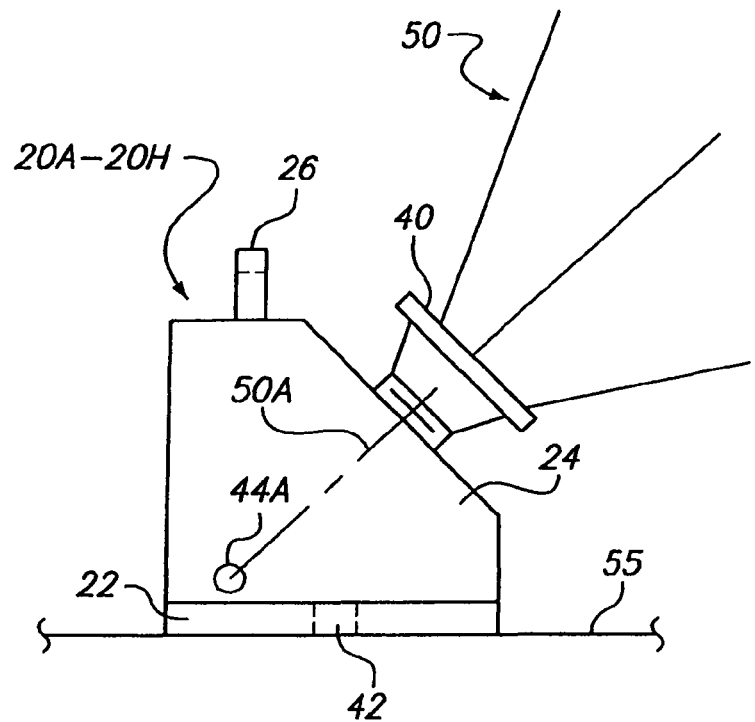
FIG. 4 is a side view of a light unit.

FIG. 4 is a side view of a light unit 20A-20H. Mechanically, each light unit comprises a base 22, a body 24 and a carrying handle 26. Electrically, each light unit comprises a floodlight lamp 40, a circular electromagnet 42 and its circuit 42A, an electrical connector (female) 44A, and on the opposite side is another connector (female) 44B, not shown.

A means for lighting can comprise a light bulb, a floodlight lamp, a heat light or others. It can range over a wide range of wattages; it can be between 60 and 1000 watts. It can have a narrow or wide light beam. It can generate a white light or color light of many types, red, green, blue and yellow being only a few.

For practical purposes, a means for lighting 40 will be an energy-efficient, outdoor, AC floodlight lamp 40 that generate a red light with a wide beam. A lamp 40 with substantial wattage, an 80 to 100 watts lamp would be ideal. The lamp 40 should be able to withstand harsh weather conditions.

The center line 50A of the lamp 40 should make an approximately 45 degrees angle with the horizontal base 22. Other angles can be used as well. The light beam 50 can shine upward slightly to create a depth in the intense, red light-center 15 of the light circle 10. A pilot can see the landing area better, review FIG. 1. The electromagnet 42 will hold a light unit 20A-20H in one place on the metallic deck 55 of a ship. The electromagnet 42 is centered in the base 22. Each of the light unit's body 24 should be painted red. This would help with the visibility of the light-circle 10.

Figure 5:
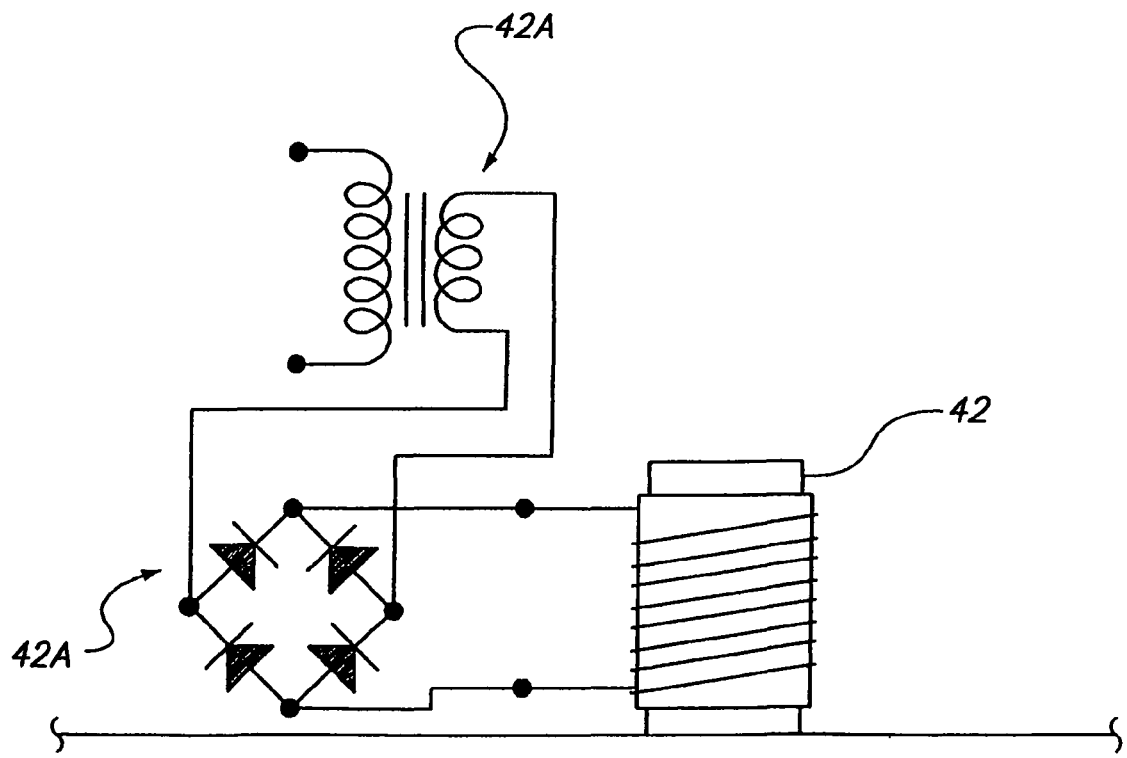
FIG. 5 is a schematic of an electromagnet and its DC circuit.

FIG. 5 is the embodiment of the electromagnet 42 and its circuit 42A. Alternating current (AC) powering an electromagnet will be less efficient than a comparable direct current (DC) powered electromagnet. It will suffer from hysteresis losses in its magnetic core, due to the repeatedly reversing the polarity of the magnetic domains in the core; this consumes power. The solution would be to use a DC circuit 42A to power the electromagnet 42. This circuit 42A will give you a pulsating DC, a more complex circuit to get a linear DC will not be necessary.

Figure 6:
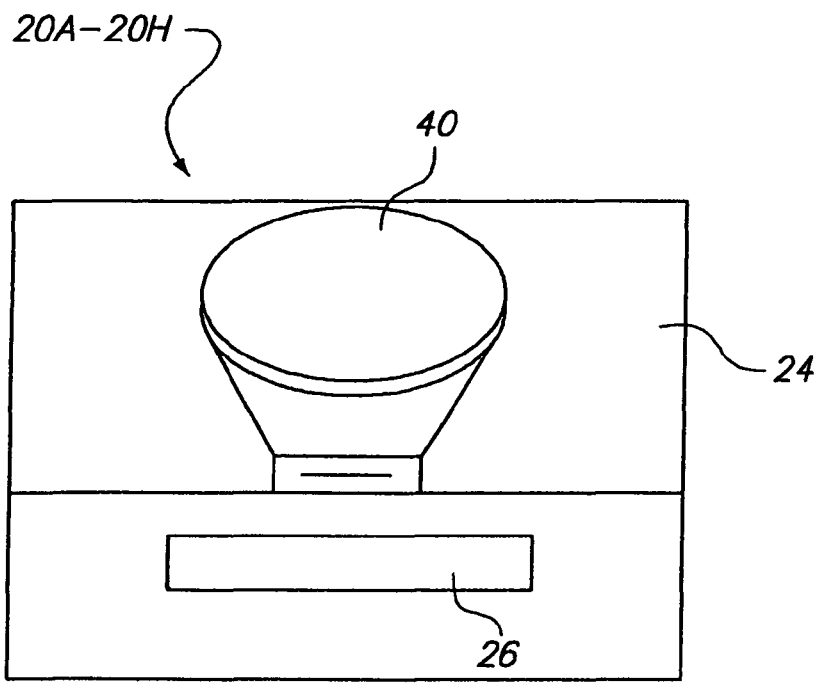
FIG. 6 is a top view of the light unit.
Figure 7:
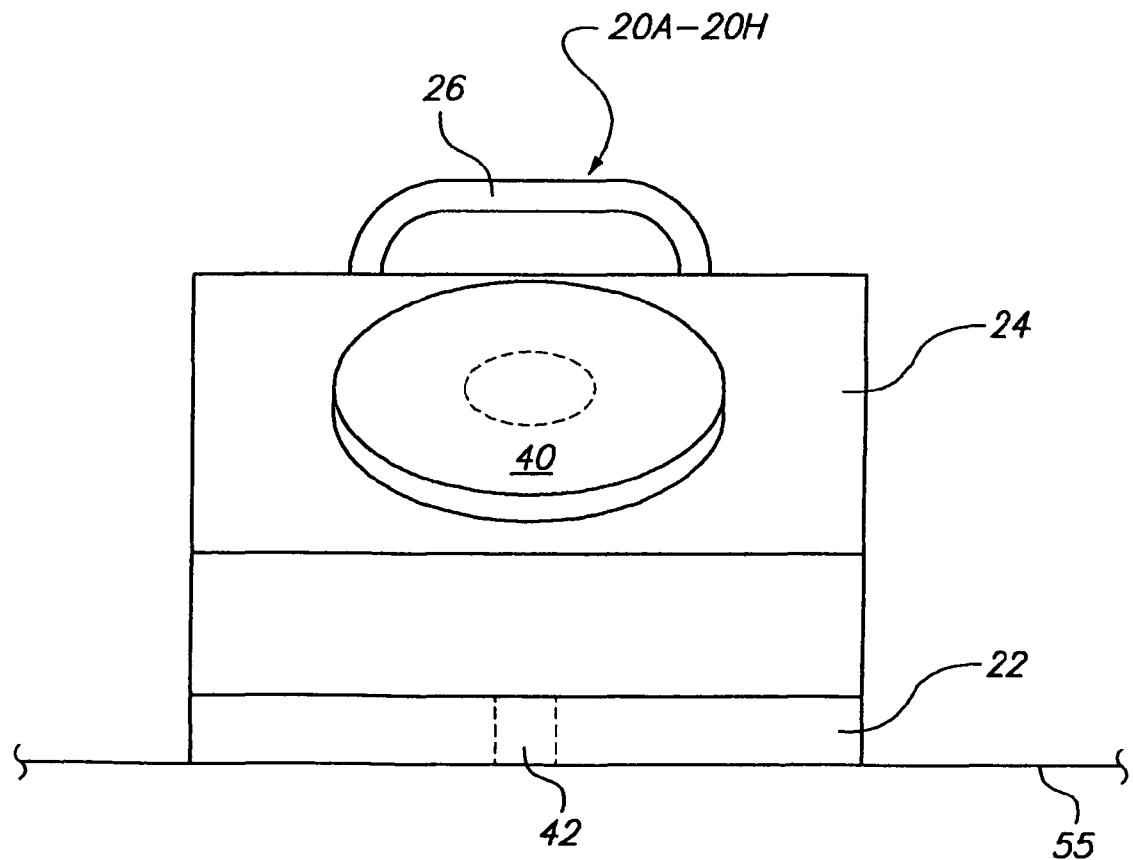
FIG. 7 is a front view of the light unit.

FIG. 6 is a top view of a light unit showing its body 24, carrying handle 26 and lamp 40. FIG. 7 is a front view of the light unit 20A-20H showing its body 24, base 22, carrying handle 26, and lamp 40. The electromagnet 42 should be just strong enough to stabilize the light unit against the ship's metallic deck 55, but can be lifted by an adult.

Series circuits use a single path to connect the electric source or sources to the output device (load) or devices (loads). They have limited uses because any change in one circuit part affects all the circuit parts. For an example, some Christmas tree lights are connected in series, when one bulb goes out they all go out. Therefore, parallel circuits are the most practical ones to use in this system.

Figure 8:
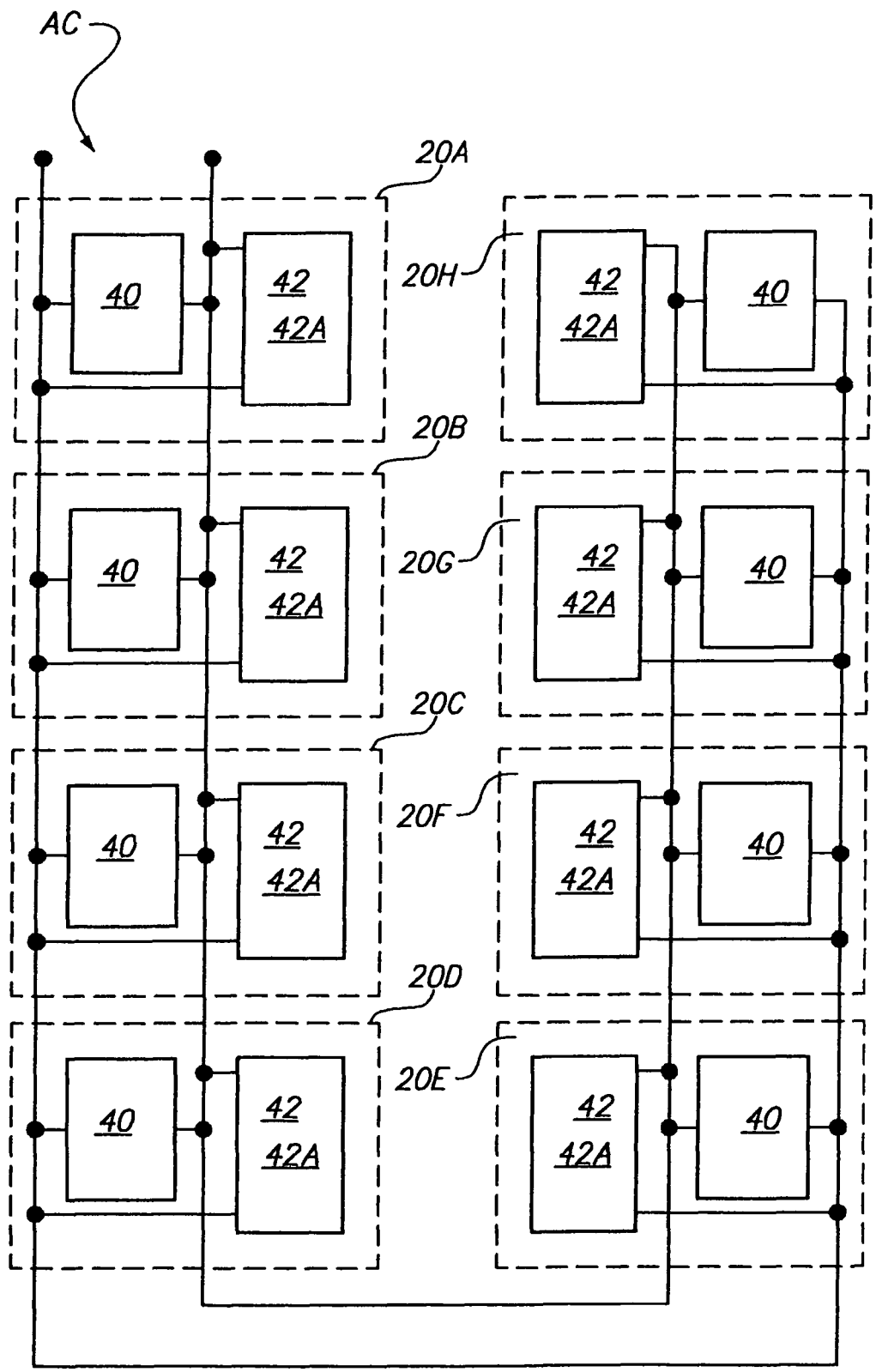
FIG. 8 is a block diagram showing the electrical parallel connections within each light unit and an input AC power supply connection.

FIG. 8 shows each light unit 20A-20H with its floodlight lamp 40 and the electromagnet 42 and its DC circuit 42A, they are connected in parallel with an electrical AC input.

Figure 9:
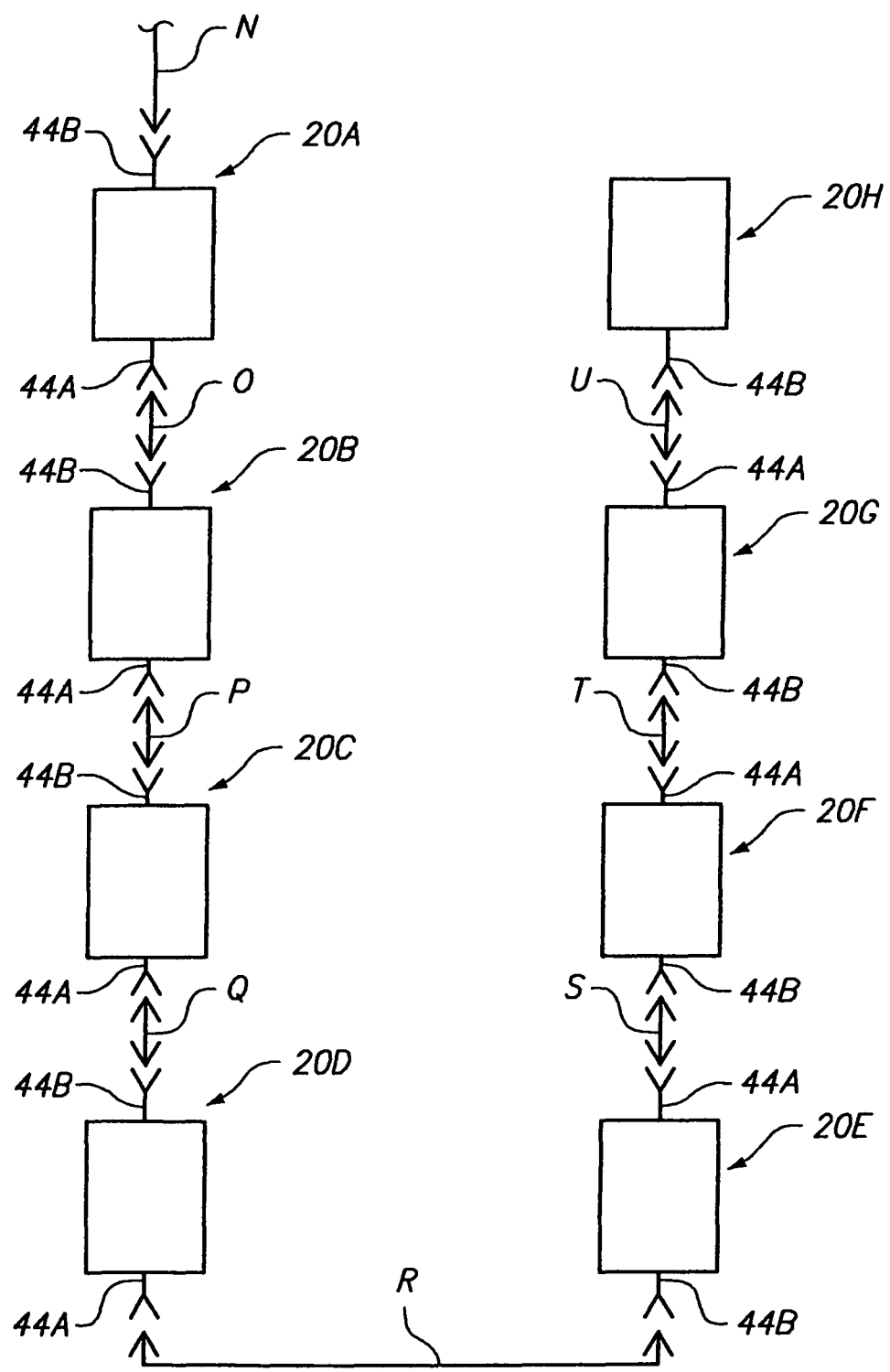
FIG. 9 is a block diagram showing the cable length and type between the light units.

FIG. 9 shows the means for connecting the light units N, O, P, Q, R, S, T, U, of the light system. The input electric power cable N can be to a portable or fixed AC or DC power supply. The electric power cables O, P, Q, R, S, T, U between the light units 20A, 20B, 20C, 20D, 20E, 20F, 20G, 20H can be of a certain length. The circumference of a light-circle 10 can be changed with different sets of lengths. Each light unit 20A-20H has two electrical connectors (female) 44A and 44B, review FIG. 4. Most cables used to transmit or distribute electric power are coaxial cables.

Figure 10:
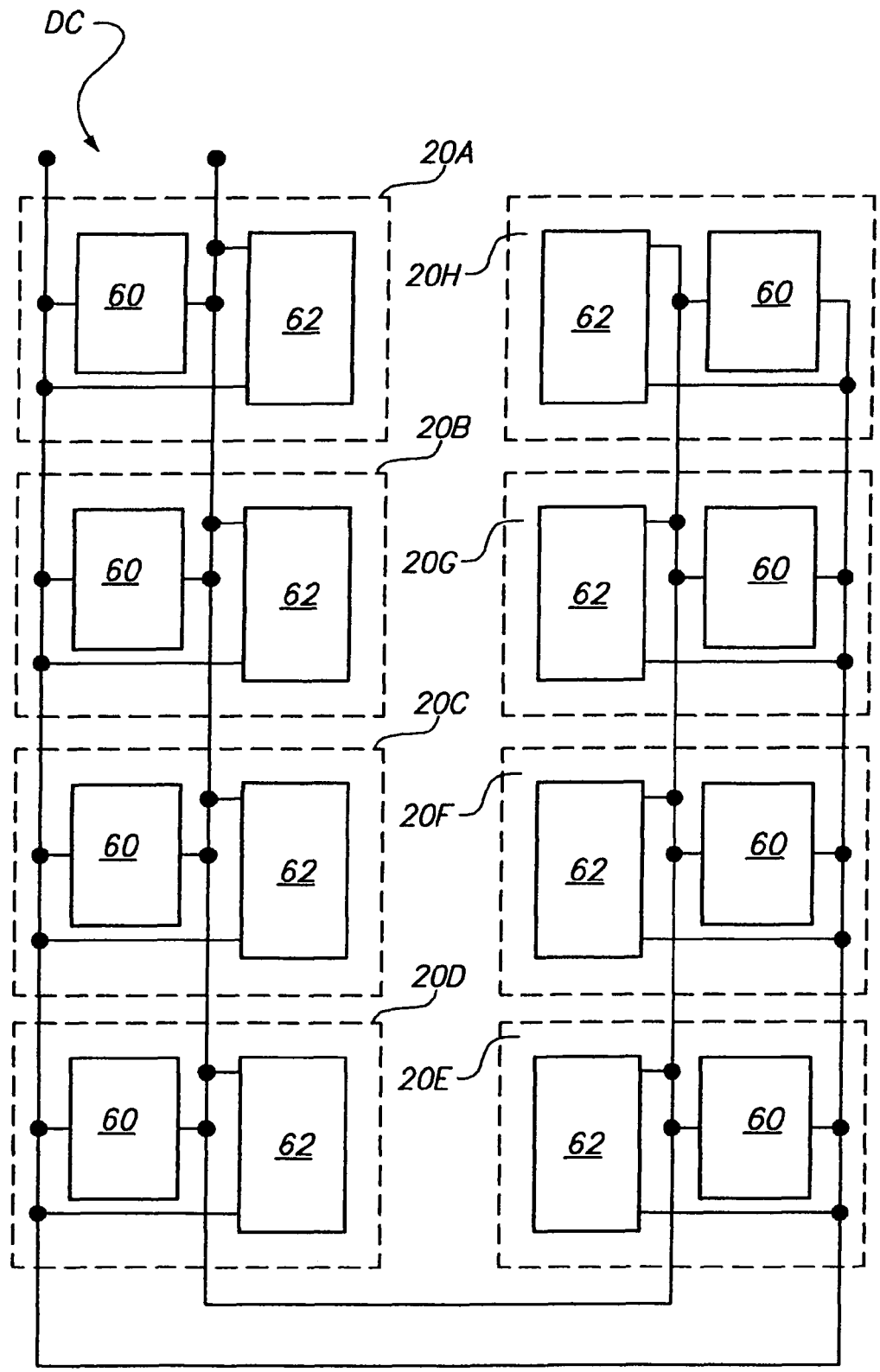
FIG. 10 is a block diagram showing the electrical connections within each light unit and an input DC power supply connection.

In FIG. 10 shows each light unit 20A-20H with its floodlight lamp 60 and an electromagnet 62 both of DC specifications, and both are connected in parallel with an electrical DC input.

Figure 11:
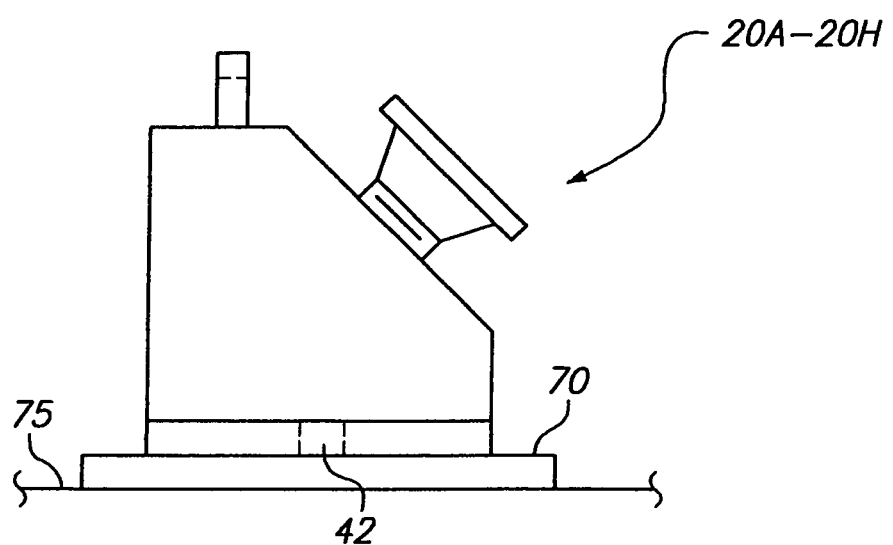
FIG. 11 is a side view of a light unit with a portable, metallic stabilizing plate.

FIG. 11 shows a light unit 20A-20H holding onto a fairly wide, light metallic plate 70 with its electromagnet 42. On a non-metallic surface 75 the wide portable metallic plate 70 helps stabilize the light unit 20A-20H.

Figure 12:
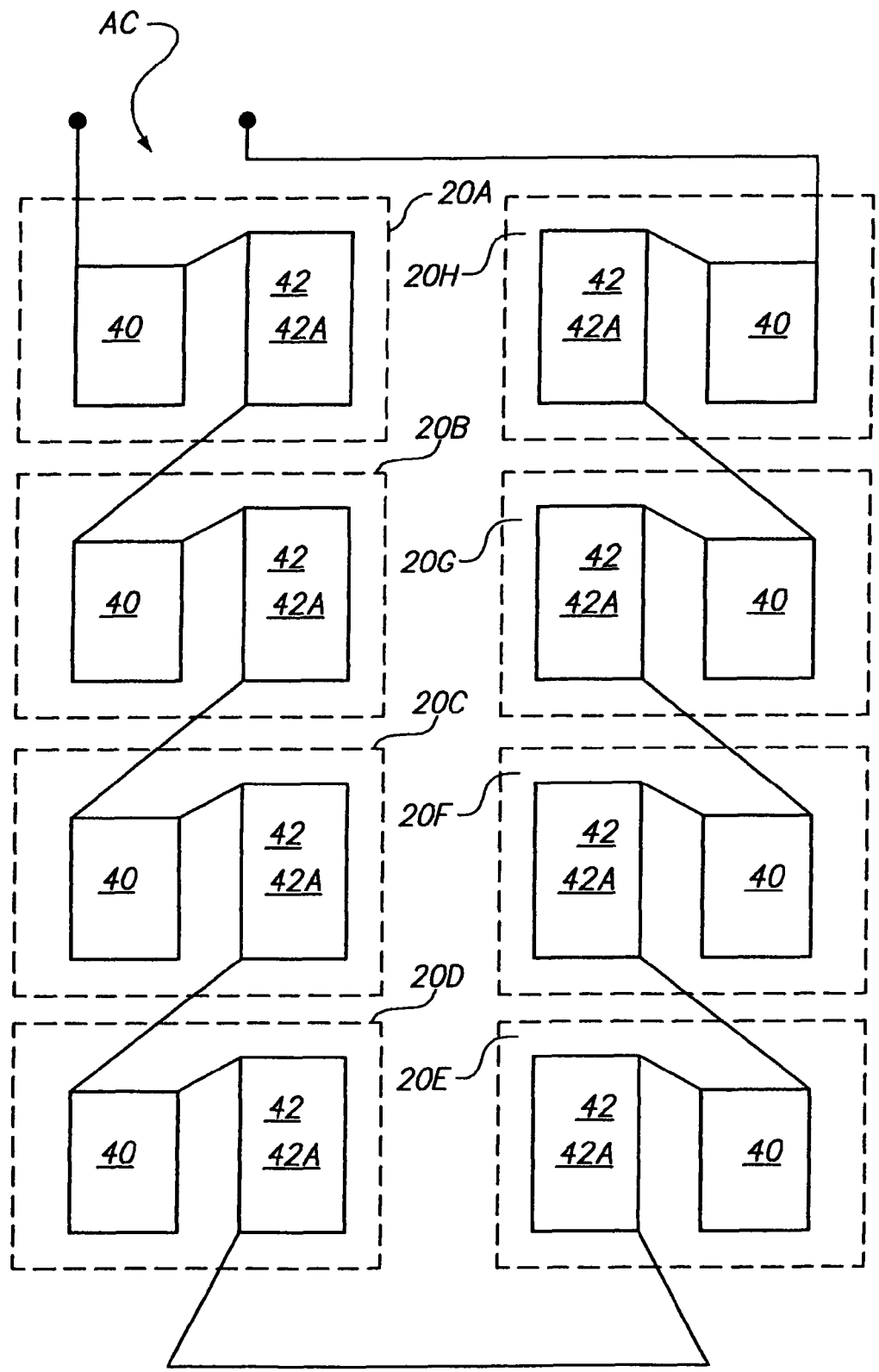
FIG. 12 is a block diagram showing the electrical series connections to within each light unit and an input AC power supply.

FIG. 12 is an alternative embodiment showing each light unit 20A-20H with its floodlight lamp 40 and the electromagnet 42 and its DC circuit 42A, they are connected in series with an electrical AC input.

No new technology is needed. The parts for this system can be purchased off a store shelf, a minor modification of an existing item, or made by relatively minor fabrication. No high profile technical knowledge is needed to operate or repair this system, just some basic knowledge of electrical theory.

I claim:

1. A light system for landing helicopters under hazardous conditions and, comprising a plurality of light units:
    a) each said light unit has a mechanical body comprising a means for lighting and two electrical connectors;
    b) said means for lighting and said two electrical connectors of each said mechanical body, each said light unit are electrically connected in parallel, wherein said two electrical connectors of each said light unit being of the female type;
    c) said light units joined together by means for connecting said light units;
    d) said light units are connected in parallel with each other;
    e) said light system of said light units has an input electric power cable;
    f) said light units are electrically connected in parallel with said input electric power cable of said light system, and
    g) whereby said light units of said light system can be manually placed in a circle, and can form a light circle when said light system is electrically connected to a power supply through said input power cable.

2. A light system for landing helicopters under hazardous conditions as claimed in claim 1, wherein said means for lighting being an energy-efficient, outdoor floodlight lamp.

3. A light system for landing helicopters under hazardous conditions as claimed in claim 2, further includes said lamp of an AC type that generates a red light with a wide beam; means for creating an intense, red light-center in said light circle.

4. A light system for landing helicopters under hazardous conditions as claimed in claim 1, wherein said means for connecting said light units together being electric power cables.

5. A light system for landing helicopters under hazardous conditions as claimed in claim 4, further includes said cables of the coaxial type.

6. A light system for landing helicopters under hazardous conditions as claimed in claim 4, further includes said cables of different sets of lengths; means for making said light circle of different circumferences is possible.

7. A light system for landing helicopters under hazardous conditions as claimed in claim 4, wherein said light units are connected electrically in parallel with an AC input electric power cable, whereby said cable is connectable to a power supply.

8. A light system for landing helicopters under hazardous conditions as claimed in claim 1, wherein said light units are connected electrically in parallel with an AC input electric power cable; whereby said cable is connectable to a power supply.

9. A light system for landing helicopters under hazardous conditions and comprising a plurality of light units and their input electric power cable as claimed in claim 1, wherein each said light unit has a mechanical body comprising an AC floodlight lamp in series with two electrical connectors, and said light units are electrically connected in series;
    whereby said light units are connectable in series to a power supply by said input power cable.

10. A light system for landing helicopters under hazardous conditions and comprising a plurality of light units:
    a) each said light unit has a mechanical body comprising a floodlight lamp of DC specifications and two electrical connectors;
    b) said floodlight lamp and said two electrical connectors of each said mechanical body of each said light unit are electrically connected in parallel, wherein said two electrical connectors of each said light unit being of the female type;
    c) said light units are joined together by coaxial cables;
    d) said light units are connected in parallel with each other;
    e) said light system of said light units has an input electric power cable;
    f) said light units are electrically connected in parallel with said input electric power cable of said light system, and
    g) whereby, said light units of said light system can be manually placed in a circle and can form a light circle when said light system is electrically connected to a power supply through said input power cable.

11. A light system for landing helicopters under hazardous conditions and comprising a plurality of light units:
    a) each said light unit has an electromagnet centered in its base;
    b) said electromagnet is electrically connected in series with a DC circuit;
    c) said electromagnet and said DC circuit are connected electrically in parallel with a floodlight lamp in said light unit;
    d) each said light unit has a mechanical body comprising a floodlight lamp of DC specifications and two electrical connectors;
    e) said floodlight lamp and said two electrical connectors of each said mechanical body of each said light unit are electrically connected in parallel, wherein said two electrical connectors of each said light unit being of the female type;
    f) said floodlight lamp is connected in parallel with two input connectors of said light unit, and g) whereby, current passing through said light unit will cause a magnetic attraction between said electromagnet and any metallic surface under said light unit.

* * * * *